(12) United States Patent
Corley

(10) Patent No.: US 6,500,912 B1
(45) Date of Patent: Dec. 31, 2002

(54) EPOXY RESIN SYSTEM

(75) Inventor: Larry Steven Corley, Houston, TX (US)

(73) Assignee: Resolution Performance Products LLC, Houston, TX (US)

( * ) Notice: Subject to any disclaimer, the term of this patent is extended or adjusted under 35 U.S.C. 154(b) by 0 days.

(21) Appl. No.: 09/660,369

(22) Filed: Sep. 12, 2000

(51) Int. Cl.$^7$ ................................................. C08G 59/44
(52) U.S. Cl. ........................ 528/113; 525/531; 525/533; 528/119; 528/124; 528/341; 528/347; 528/405; 528/417
(58) Field of Search .................................. 528/113, 119, 528/124, 341, 347, 405, 417; 525/531, 533; 523/402, 404, 406, 417, 420, 428

(56) References Cited

U.S. PATENT DOCUMENTS

| | | |
|---|---|---|
| 2,926,116 A | 2/1960 | Keim ........................ 162/164 |
| 3,655,595 A | 4/1972 | Higashi |
| 4,070,225 A | 4/1972 | Higashi et al. |
| 4,082,708 A | 4/1978 | Mehta |
| 4,086,197 A | 4/1978 | Bouche et al. |
| 4,115,296 A | 9/1978 | Andrews |
| 4,188,221 A | 2/1980 | Nanpei et al. |
| 4,206,097 A | 6/1980 | Drawert et al. ............... 260/18 |
| 4,268,656 A | 5/1981 | Chaudhuri et al. |
| 4,332,711 A | 6/1982 | Kooymans et al. |
| 4,362,847 A | 12/1982 | Kooljmans et al. |
| 4,569,971 A | 2/1986 | Sasse et al. |
| 4,698,396 A | 10/1987 | Drawert et al |
| 4,717,746 A | 1/1988 | Leoni et al. |
| 5,017,675 A | 5/1991 | Marten et al. ............... 528/111 |
| 5,171,795 A | 12/1992 | Miller et al. ................. 525/430 |
| 5,296,556 A | 3/1994 | Frihart |
| 5,296,557 A | 3/1994 | Frihart |
| 5,301,940 A | 4/1994 | Seki et al. |
| 5,319,004 A | 6/1994 | Marten et al. |
| 5,385,986 A | 1/1995 | Frihart et al. |
| 5,389,705 A | 2/1995 | Huemke et al. ............. 523/417 |
| 5,424,371 A | 6/1995 | Frihart et al. |
| 5,428,083 A | 6/1995 | Smith et al. |
| 5,447,785 A | 9/1995 | Kishi et al. |
| 5,576,416 A | 11/1996 | Walker |
| 5,605,944 A | 2/1997 | Heebner |
| 5,612,448 A | 3/1997 | Frihart |
| 5,614,597 A | 3/1997 | Bower ........................ 525/430 |
| 5,936,046 A | 8/1999 | Ghosh ........................ 525/449 |
| 5,962,629 A | 10/1999 | Corley et al. |
| 5,998,508 A | 12/1999 | Corley et al. |
| 6,013,757 A | 1/2000 | Corley et al. |
| 6,127,508 A | 10/2000 | Corley et al. |
| 6,274,682 B1 | 8/2001 | Corley et al. |

FOREIGN PATENT DOCUMENTS

| | | | |
|---|---|---|---|
| EP | 0423577 A1 | 10/1990 | |
| JP | 51-048081 | 12/1976 | |
| JP | 60-219281 | 4/1984 | |
| JP | 61-073734 | 4/1986 | |
| JP | 06329979 | 11/1994 | |
| JP | 09165493 | 11/1995 | ........... C08L/63/00 |
| JP | 09165494 | 11/1995 | ........... C08L/63/00 |

OTHER PUBLICATIONS

Abstract of JP 61–162564, filed Jul. 1986.

*Primary Examiner*—Robert Dawson
*Assistant Examiner*—D. Aylward

(57) ABSTRACT

A curable epoxy composition comprises an epoxy resin having at least 1.5 epoxy groups per molecule and an amine-terminated polyamide. The liquid amine-terminated polyamide is prepared by reacting a long-chain, $C_{20}$–$C_{60}$ dicarboxylic acid or derivative with an amine having a general formula of $R^1$—NH—$R^2$—NH—$R^3$.

16 Claims, 2 Drawing Sheets

EPOXY RESIN SYSTEM

FIELD OF THE INVENTION

The present invention relates to a curable epoxy composition and a substrate coated with the curable epoxy composition. The epoxy composition comprises an epoxy resin having at least 1.5 epoxy groups per molecule and an amine-terminated polyamide, preferably a liquid amine-terminated polyamide.

BACKGROUND OF THE INVENTION

A typical commercial ambient-cure epoxy coating contains condensates of dimerized fatty acids (dimer acids) with polyethylene polyamines containing four or more amine hydrogens as a curing agent and a solution of a solid epoxy resin. This type of epoxy coating has excellent flexibility, good adhesion to many substrates, and good resistance to water and many types of solvents. As a result, these coatings find many applications in areas such as chemically resistant coatings, aesthetic topcoats, secondary containment membranes, films and others. However, such a system generally requires an organic solvent content of almost 50% in order to obtain a sprayable formulation with a Gardner D or lower viscosity. After application or use, the bulk of this organic solvent evaporates into the atmosphere as volatile organic compound (VOC). VOC's are believed to cause adverse effects environmentally. Therefore, it is desirable and advantageous to reduce the required organic solvent content as much as possible in order to reduce the VOC content.

One way the organic solvent requirement can be reduced considerably is to use a system based on a liquid epoxy resin and the same polyethylenepolyamine curing agents. However, this approach tends to lead to coatings with lower flexibility. Accordingly, it is one object of the present invention to provide a curable epoxy coating system that has good or better flexibility with liquid epoxy resin and/or solid epoxy resin having reduced or comparable solvent requirements.

It is another object of the present invention to have a method for preparing a curable epoxy composition that is useful for various applications in coatings, secondary containment membranes, films or others, wherein the finished product has good tensile elongation property with no or only minimal adverse impacts on the tensile or tear strength over a wide curing agent-to-epoxy resin ratio.

It is a further object to prepare or provide articles, membranes, secondary containment membranes, films, topcoats or substrates coated with a cured composition. Curing may be carried out under effective conditions during and/or after the application of the epoxy coating.

BRIEF DESCRIPTIONS OF THE DRAWINGS

SUMMARY OF THE INVENTION

Figure 1:
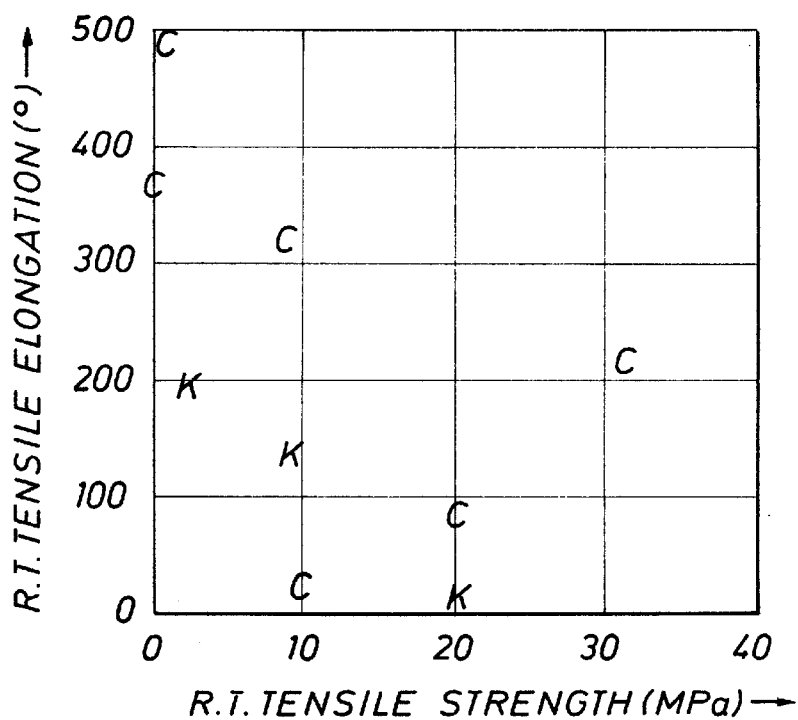
FIG. 1 shows R.T. (room temperature) tensile elongation as a function of R.T. tensile strength for systems C (with curing agent of this invention) and K (with a commercially available curing agent, Witco Humko KEMAMINE® DP-3695) respectively.

The present invention relates to a curable epoxy composition. The curable epoxy composition comprises an epoxy resin having at least 1.5 epoxy groups per molecule and an amine-terminated polyamide, preferably a liquid amine-terminated polyamide. The amine-terminated polyamide is prepared by reacting (a) a compound selected from the group consisting of $C_{18}$–$C_{60}$ dicarboxylic acids, $C_{18}$–$C_{60}$ dicarboxylic acid derivatives and mixtures thereof; and (b) at least one amine having a formula of $R^1$—NH—$R^2$—NH—$R^3$, wherein $R^1$, having a total number of carbon atoms from 0 to about 20, is selected from the group consisting of H, alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl; $R^3$, having a total number of carbon atoms from 1 to about 20, is selected from the group consisting of alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl; and $R^2$ is $(CR^4R^5)_n$, wherein n is selected from 2 to about 20, $R^4$ for each $(CR^4R^5)$ is independently selected from the group consisting of H, alkyl, aryl, hydroxyl, alkoxy, alkylthio, dialkylamino and cyano; and $R^5$ for each $(CR^4R^5)$ is independently selected from the group consisting of H, alkyl and aryl.

This invention also relates to articles, membranes, secondary containment membranes, and substrates or articles coated, top-coated or impregnated with the composition. Curing of the composition on such substrates or articles is carried out under effective conditions during or after the application, or both.

DETAILED DESCRIPTION OF THE INVENTION

The curable epoxy composition of the present invention comprises an epoxy resin and an amine-terminated polyamide. Amine-terminated polyamides existing in liquid form at ambient conditions, also referred to as liquid amine-terminated polyamides, are preferred. The polyamide serves as a curing agent to form a coating or an article or a membrane of the epoxy resin after curing, preferably ambient condition curing.

Because the amine-terminated polyamides serve as curing agents for the epoxy resin present in the curable epoxy composition, they should be present in an amount sufficient to effect the desired degree of curing of the composition under the curing conditions within a acceptable curing time. Accordingly, for the present invention, the mole ratio of the epoxy resin to the amine-terminated polyamide, particularly the liquid amine-terminated polyamides prepared in accordance with the reaction disclosed herein, is preferably in the range of from about 3:1 to about 1:3, more preferably from about 2:1 to about 1:2. Mole ratios outside these limits or ranges also may be used. In particular, smaller amounts of the polyamides may be used where there are other curing agents, curing accelerators or other curing aids.

Suitable epoxy resins for the epoxy composition comprise or include any curable epoxy resins that can be cured in the presence of the amine-terminated polyamide, which serves as a curing agent. It is preferred that such a curable epoxy resin comprises, or is characterized by having, on average, at least one (1), preferably at least 1.5 epoxy groups per molecule and more preferably at least 1.8 epoxy groups per molecule. The epoxy groups are also referred to as 1,2-epoxy and/or 1,2-epoxide groups and/or oxirane groups.

Suitable epoxy resins may be saturated or unsaturated or mixed, linear or branched or mixed, aliphatic, aliphatic with aromatic moieties, heterocyclic or mixed, and may bear other substituents, which do not materially interfere with the desired curing reaction. Examples of such substituents include, but are not limited to, halogens such as bromine and chlorine and substituted aliphatic or aromatic groups. Aliphatic epoxy resins are preferred for applications in highly ultraviolet (UV)-resistant topcoats, while polyglycidyl ethers of di- or polyhydric phenol type aromatic epoxy resins (infra) can be used preferably for other types of applications, including cathodic electrodeposition.

Furthermore, the epoxy resin may be monomeric or polymeric (including oligomers in all forms from dimers and up). Depending primarily on their chemical compositions and molecular weights, the epoxy resins can be liquid, solid or mixtures under ambient conditions, particularly at room temperature (about 25° C.). Liquid epoxy resins under ambient conditions are more preferred for the curable epoxy composition of the present invention. If solid epoxy resins are used, it is preferred to dissolve them in a suitable solvent to make epoxy resin containing solutions for ambient condition applications. Epoxy resin suspensions or emulsions also may be used for the present invention.

One group of suitable epoxy resins, including the preferred glycidyl or polyglycidyl ethers, may be prepared by reacting epichlorohydrin with a compound containing at least one, preferably at least two or more, hydroxyl groups under basic conditions, such as in an alkaline reaction medium or in the presence of a suitable base. Examples of such suitable epoxy resins include, but are not limited to, polyglycidyl ethers of poly- or dihydric phenols, polyglycidyl ethers of glycols or polyglycols, epoxy novolacs, other glycidated polyphenolic resins, polyglycidyl esters of polycarboxylic acids, fusion reaction products between these epoxy resins and additional polyhydric phenolic compounds as those disclosed and described in U.S. Pat. Nos. 3,477,990 and 4,734,468, and mixtures thereof. Examples of suitable phenolic compounds used in preparing these epoxy resins include, but are not limited to resorcinol, catechol, t-butylcatechol, hydroquinone, bisphenol A (BPA), bisphenol E (BPE), bisphenol F (BPF), tris(4-hydroxyphenyl) methane, 1,1-bis(4-hydroxyphenyl)isobutane, 2,2-bis(4-hydroxyphenyl)butane, 2,2-bis(4-hydroxy-3-tert-butylphenyl)propane, 1,1-bis(4-hydroxyphenyl) cyclohexane, 2,6,2',6'-tetrachloro-p, p'-bisphenol A, 2,6,2', 6'-tetrabromo-p,p'-bisphenol A, 2,6,2',6'-tetramethyl-3,5,3'-tribromo-p-p'-biphenyl, 2,6,2',6'-tetramethyl-3,5,3',5+-tetrabromo-p,p'-biphenyl, tetramethylbiphenol, 1,5-dihydroxynaphthalene, bis(2-hydroxy-1-naphthyl)methane, bis(4-hydroxyphenyl) sulfone, bis(4-hydroxyphenyl) ether and the like and mixtures thereof. Some examples of commercially available epoxy resins of this group include, but are not limited to, EPON® Resins 825, 826, 828, 862 and 1000 from Shell Chemical Company. EPON is a registered trademark of Shell Oil Company.

Another group of epoxy resins within the embodiment of the present invention is useful for elastomeric or semi-elastomeric secondary containment membrane applications due to the desired low viscosity, low modulus and high elongation properties of the cured product. This group includes, but is not limited to, polyglycidyl ethers of aliphatic or cycloaliphatic glycols or triols or polyols, or polyglycols. Examples of these glycols include, but are not limited to, 1,4-butanediol, 1,5-pentanediol, 1,6-hexanediol, neopentyl glycol, cyclohexanedimethanol, hydrogenated BPA, polyethylene glycol, polypropylene glycol, trimethylolethane, trimethylolpropane and mixtures thereof. Similar to the di- and polyhydric phenol is based epoxy resins, these aliphatic glycidyl and polyglycidyl ethers are usually prepared by reacting epichlorohydrin with a selected aliphatic diol (or triol or polyol or polyglycol or mixtures) in the presence of a Lewis acid catalyst, followed by conversion of the reaction intermediate(s) with sodium hydroxide to the product(s). Examples of commercially available epoxy resins in this group include, but are not limited to, HELOXY® Modifier 32 (a diglycidyl ether of a poly (propylene oxide) glycol), HELOXY® Modifier 68 (the diglycidyl ether of neopentyl glycol) and HELOXY® Modifier 107 (the diglycidyl ether of 1,4-cyclohexanedimethanol) from Shell Chemical Company. HELOXY is a registered trademark of Shell Oil Company.

The other necessary component of the curable epoxy composition is an amine-terminated polyamide, preferably a liquid amine-terminated polyamide. As a specific embodiment of the present invention, the amine-terminated polyamide can also be a solid. This amine-terminated polyamide may be prepared from a variety of starting materials under suitable conditions by using a number of different reaction pathways. For example, long chain di- or polycarboxylic acids can react with various suitable primary or secondary di- or polyamines to produce the desired polyamides, either directly or via an intermediate followed by another reaction such as hydrolysis (for example, see EXAMPLE 3 below). Certain derivatives of the carboxylic acids also may be used. Dicarboxylic acids or their derivatives or mixtures thereof are non-limiting examples of the preferred starting materials for making the amine-terminated polyamide products, particularly liquid polyamides.

Illustrative examples of suitable derivatives of di- or polycarboxylic acids (infra) include, but are not limited to, mono-, di- or polyhalides, mono-, di- or polyesters, mono-, di- or polyanhydrides, activated mono-, di-, or polyamides, halide/esters, halide/anhydrides, halide/acids, halide/activated amides, ester/activated amides, or mixtures thereof as well as mixtures of said di- or polycarboxylic acids themselves. Particularly preferred derivatives of acids include dicarboxylic anhydride, dicarboxylic halide, dicarboxylic acid monoester, dicarboxylic acid diester and mixtures thereof. Halides include fluorides, chlorides, bromides, iodides and mixtures thereof. Considering environmental impact, cost, availability, reactivity and toxicity, carboxyl chlorides generally are generally the preferred carboxyl halides. Examples of esters include, but are not limited to methyl esters, ethyl esters, propyl esters, glycol esters, mixtures thereof and others.

Preferred carboxylic acids suitable for preparing the amine-terminated polyamides include, but are not limited to, long chain di- or polycarboxylic acids having from about 18 carbon atoms to about 60 carbon atoms ($C_{18}$–$C_{60}$), more preferably from about 30 carbon atoms to about 40 carbon atoms ($C_{30}$–$C_{40}$); dimerized or polymerized unsaturated fatty acids (collectively, dimer acids); and adducts of acrylic acid or methacrylic acid or crotonic acid or mixtures thereof with unsaturated fatty acids (adduct acids).

One or more long chain di- or polycarboxylic acids may be used-for making a; polyamide product. Optionally, there may be one or more other additional di-or polycarboxylic acids mixed in with the long chain carboxylic acids. These additional di- or poly-carboxylic acids or acid derivatives may have 4 to about 20 carbon atoms. Examples include succinic acid, glutaric acid, glutaric anhydride, glutaryl dichloride, adipic acid, sebacic acid, azelaic acid and mixtures thereof. The amount of such di- or poly-carboxylic acid or acid derivative is from about 0 to 10% of total carboxyl equivalent. Monobasic carboxylic acids may be present in minor amounts, from about 0 to about 25% of total carboxyl equivalent. These monobasic carboxylic acids may serve as chain terminators to control the molecular weight of the polyamide product.

"Dimer acid" as used herein refers to the products prepared from addition dimerization or polymerization of unsaturated fatty acids, such as tall oil fatty acids. The reaction is usually carried out at an elevated temperature in the presence of a catalyst. For instance, when unsaturated $C_{18}$ monobasic acids such as oleic acid or linoleic acid or mixtures are used as the starting material, the product composition comprises up to 20% of the monobasic acids, from about 45% to about 95% of $C_{36}$ or dibasic acids (dicarboxylic acids) and from about 1% to about 35% of $C_{54}$ or tribasic and higher acids (collectively, polycarboxylic acids). Some examples of the polymerization and the resultant products can be found in U.S. Pat. No. 3,157,681.

Examples of adduct acids are adducts prepared by reacting (a) a small Two unsaturated acid such as acrylic acid, or methacrylic acid, or crotonic acid, or mixtures thereof, or other unsaturated carboxylic acids and mixtures, with (b) an unsaturated fatty acid such as linoleic acid, or soybean oil fatty acid, or tall oil fatty acid, or mixtures thereof, or other fatty acids. Methods for preparing such adduct acids are described in, for example, U.S. Pat. No. 3,753,968.

Many different di- and polyamines and their mixtures may be used to react with the di- or polycarboxylic acids disclosed herein to prepare the desired amine-terminated polyamides for the present invention. Aminoalkylpiperazines, such as those described in U.S. Pat. No. 5,998,508 (the '508 patent) are not preferred amines, in and by themselves, for the purposes of the present invention. However, it is within the embodiment of the present invention that they are used as additional amines in conjunction with at least one of the present preferred di- or polyamines disclosed herein as mixtures for preparing the polyamides. To the extent that the '508 patent discloses such various aminoalkylpiperazines, it is incorporated herein by reference.

Preferred di- or polyamines for the present invention are represented by the following general formula:

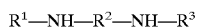

$R^1$—NH—$R^2$—NH—$R^3$ $R^1$ has a total number of carbon atoms from 0 to about 20. $R^1$ is selected from the group consisting of H, alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl and dialkylaminoaryl.

$R^3$ has a total number of carbon atoms from 1 to about 20. $R^3$ is selected from the group consisting of alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl and dialkylaminoaryl. $R^1$ and $R^3$ may be the same, but $R^3$ may not be H.

$R^2$ consists of $(CR^4R^5)_n$, wherein n is from 2 to about 20, preferably from 2 to about 6. Each $(CR^4R^5)$ is independently selected from the other $(CR^4R^5)$'s in the same structure. $R^4$ is independently selected for each $(CR^4R^5)$ from the group consisting of H, alkyl, aryl, hydroxyl, alkoxy, alkylthio, dialkylamino and cyano. $R^5$ is independently selected for each $(CR^4R^5)$ from the group consisting of H, alkyl and aryl. $(CH_2)_n$ is a preferred $R^2$, and it is more preferred to have n=2 or 3 or 4, i.e. $(CH_2)_2$, $(CH_2)_3$ or $(CH_2)_4$ or mixtures thereof.

Some examples of preferred diamines and polyamines for making the polyamides include, but are not necessarily limited to, N-methylethylenediamine, N-ethylethylenediamine, N-benzylethylenediamine, N,N'-dimethylethylenediamine, N,N'-diethylethylenediamine, N-(2-hydroxyethyl)ethylenediamine (HEED), N-(2-cyanoethyl)ethylenediamine, N-(2-methoxyethyl) ethylenediamine, N-cyclohexyl-1,3-propanediamine, 2-hydroxy-N-methyl-1,3-propanediamine, N-methyl-1,6-hexanediamine and mixtures thereof. HEED, N-cyclohexyl-1,3-propanediamine and their mixtures are examples of the more preferred amines.

Examples of preferred polyamides are amine-terminated polyamides. More preferred are liquid amine-terminated polyamides. In terms of chemical structures, it is more preferred that the polyamide have a number average amine hydrogen functionality (N—H) in the range of from about 1.7 to about 4.0. It is also preferred to have more amine functional groups than acid functional groups. The combined amine plus acid number is preferably greater than about 250.

As described earlier, it is preferred that the amine-terminated polyamide be a liquid. The term "liquid" as used herein refers to products and compositions that have a melting point or ring and ball softening point (ASTM E28-67) below room or ambient temperature (typically about 25° C.). In other words, the product can be readily poured as a liquid or fluid under ambient conditions. Whether a polyamide or a polyamide mixture is a liquid is dictated primarily by the chemical structure(s) and the (average) molecular weight. Examples of the preferred liquid amine-terminated polyamides are oligomers prepared by reacting di- or polycarboxylic acids or acid derivatives with di- or polyamines as disclosed herein. The number average molecular weight of the preferred polyamide product is from about 400 to about 3,000, preferably from about 700 to about 2,000.

In preparing the amine-terminated polyamides, particularly the liquid amine-terminated polyamides, the ratio of moles of amine molecule to equivalents of carboxyl group in the acid or acid mixture or acid derivative should be greater than about 0.75 to 1, preferably greater than about 0.9 to 1, and more preferably greater than 1 to 1. While there is no theoretical upper limit to this mole ratio, it is not preferred to have the ratio much greater than about 4 to 1 for practical or economic reasons. Too much amine in the reaction mixture would incur additional or excessive problems in waste disposal, raw material cost, separation, recycling and other areas.

The reaction to form amine-terminated polyamides is generally carried out under conditions effective to achieve a desired level of conversion. The temperature of the reaction mixture is usually increased to 200° C. or higher, preferably to a temperature in the range of from about 220° C. to about 260° C. Reaction time may vary depending on the particular reactants selected. The product is then subjected to separation to recover the desired polyamide. Unreacted materials, solvent, if any, water, if any, or other reaction by-products or co-products such as alcohols are removed conveniently by distillation or vacuum distillation or other chemical and physical separation methods. It may be possible, sometimes even preferred, to remove some of the byproducts or co-products continuously during the reaction in order to facilitate the reaction or shift reaction equilibrium.

In addition to the epoxy resin and the liquid amine-terminated polyamide, the curable epoxy composition may further comprise other components. For instance, the composition may contain from about 0 wt % to about 70 wt % of water, based on total weight of the entire final composition. A water-containing composition is preferred to be in an emulsion form, more preferably in an oil-in-water emulsion form. Accordingly, it also may necessary to add certain other additives to form, to stabilize and/or to maintain the emulsion state. Compositions as suspensions in water also may be used.

The epoxy composition also may comprise various amounts of organic solvents, from about 0% to about 65%, preferably from about 0% to about 30%, all by weight and based on the total weight of the curable epoxy resin composition, to minimize VOC release into the environment during or after use. Accordingly, the "solids content" in the curable epoxy composition is in the range of from about 100% to about 30%, preferably from about 100% to about 70%, all by weight.

For easy handling and other purposes, the amine-terminated polyamide, the epoxy resin, or both, in the composition also may be diluted with certain amounts of organic solvent(s) such as aliphatic, aromatic or cyclic ketones, alcohols, glycol ethers, esters or mixtures thereof. If any solvent(s) is desirable, it is typically used in the range of from about 0 wt % to about 20 wt %, based on the weights of the epoxy resin and polyamide respectively.

The composition may also comprise an accelerator or other similar materials for a variety of purposes. A number of such accelerators and other materials are known to be compatible with amine-functional groups. Examples include sulfonates such as alkylbenzenesulfonates, phosphonates, sulfates, tetrafluoroborates, carboxylates and nitrates of Groups IA, IIA and transition metals of the Periodic Table (CAS version), preferably Mg, Ca, and Sn (II) salts and complexes. Other examples of accelerators include inorganic acids such as $HBF_4$, $H_2SO_4$, $H_2NSO_3H$, and $H_3PO_4$; carboxylic acids, particularly hydroxyl-group containing carboxylic acids such as salicylic acid, lactic acid, glycolic acid and resorcylic acid; phenolic compounds such as phenol, t-butylphenol, nonylphenol and BPA; imidazoles; cyanamide compounds such as dicyandiamide and cyanamide; sulfonamides such as p-toluenesulfonamide; and imides such as phthalimide, succinimide, maleimide, perylene-tetracarboxylic diimide, and saccharin. Preferred accelerators useful for the present invention include, but are not limited to calcium nitrate, calcium alkylbenzene sulfonates, magnesium alkanesulfonates, dicyandiamide, tetrafluoroboric acid, salicylic acid, phenol, dichloroacetic acid, trifluoroacetic acid and mercaptoacetic acid.

Depending on a number of factors such as the activity of the curing agent, the curing temperature, the type of application, the amine function of the curing agent being hindered, the concentration of the curing agent used and others, the amount of accelerators in the epoxy composition may be in the range of from about 0 wt % to about 10 wt %, based on the weight of the epoxy resin in the epoxy composition.

Other additional auxiliary components in the epoxy composition may include flow control additives such as solvents and anti-sag agents, pigments, tints, reinforcing agents, fillers, elastomers, stabilizers, extenders, plasticizers, slip agents, flame retardants, defoamers, thixotropes and others.

All of the various components of the final curable epoxy composition may be mixed, admixed or blended simultaneously or in any order, with or without additional solvent or diluent, at a temperature below the curing temperature, which is around 100° C. for most applications. It is also within the embodiment of the present invention to keep the epoxy resin and the (liquid) amine-terminated polyamide (curing agent) separate until the time of application, particularly when shelf stability or shelf life of the completely mixed composition is not acceptable. This is sometimes referred to as a two-pack system in industry.

The curable epoxy composition disclosed herein may be cured under conditions effective to produce an article, a membrane such as a secondary containment membrane, a film or a cured coating on a surface of a substrate. More, specifically, the curable epoxy composition prepared in accordance with this invention can be cured for most coating and/or topcoating applications at a temperature in the range of from about −40° C. to about 100° C., preferably from about −10° C. to about 75° C. For secondary containment membrane applications, a most preferred curing temperature is ambient temperature, about 25° C. For applications in electrodeposition, a preferred curing temperature is in the range of from about 150° C. to about 300° C. A sufficient curing time depends on the application, composition, the curing temperature, the substrate, the article, the surface and many other factors. As known to those skilled in the art, it may be beneficial to control some other curing conditions such as humidity, pressure, etc.

As a specific embodiment of the present invention, the present epoxy resin composition with the present polyamide curing agent are formulated as non-waterborne compositions suitable for making coatings, adhesives, or sizing or for impregnating substrates such as sheets, cords, yarns and prepregs, as well as for making secondary containment membranes. The present epoxy resin composition may also contain a hydroxy-functional amine (such as poly(β-hydroxyalkyl) amines) in addition to the present polyamide curing agent.

As another specific embodiment of the present invention, the present polyamide is mixed with water to form an oil-in-water emulsion (dispersion) before being mixed with the epoxy resin to provide a waterborne formulation suitable for use as adhesives and coatings. The waterborne composition can be used to impregnate/size or coat various types of substrates such as nylon, polyester, fiberglass, graphite and aramid. The applications include belt cord, hose cord and tire cord in automotive, industrial, agricultural and domestic fields.

The present thermoset epoxy composition can also be used to make waterproofing membrane for use as a roof coating, parking deck coating, hail resistant roofing (tiles), land fill, liner, basement water barrier, or water retention pond liner. It can also be mixed with various fillers to form excellent hail resistant roofing tiles.

Accordingly, various articles or substrates or surfaces of substrates or membranes such as secondary containment membranes may be coated or prepared by using and curing the curable epoxy composition disclosed herein. There are also many different ways the composition can be applied to or for each type of these and other applications known to those skilled in the art. Examples include, but are not limited to, spraying, spreading, impregnation, brushing, rolling, (electro)deposition, without or with any additional solvent, and combinations thereof. All of these and other ways or methods or processes known to one skilled in the art may be used with the composition of the present invention in different applications.

In some applications, such as cathodic electrodeposition, it may be preferred to add another amine, particularly hydroxy-functional amines such as diethanolamine, to the composition. The compositions would provide to the finished coating more flexibility, better impact resistance and better chip resistance.

The following examples illustrate a number of specific embodiments of the present invention. They are not intended and should not be interpreted to limit the spirit and scope of the invention.

EXAMPLE 1

A dimer acid with a Gardner viscosity of Z4-1/4 and a carboxyl equivalent weight of 282 (2116.6 grams) and 1,562.2 grams of HEED, N-(2-hydroxy-ethyl) ethylenediamine, were mixed in a five liter, 4-neck round bottom flask equipped with an external heating mantle, a paddle stirrer, a thermocouple, a nitrogen purge inlet and a Vigreux column having a vacuum distillation takeoff. With stirring, the system was purged with nitrogen and heating was started. When the temperature of the reaction mixture reached about 170° C., distillation of water began to take place at atmospheric pressure. The temperature was gradually raised to about 225° C. over a period of 2.5 hours, and then held between 225° C. and 228° C. for approximately 40 minutes. The first cut of distillate, 189.56 grams, was removed. The system was then subjected to vacuum to remove residual HEED. The system was kept under vacuum for 50 minutes, with the temperature at about 230° C. and the pressure at approximately 30 Pa during the final 15 minutes of this period. The vacuum was then broken with nitrogen and the material in the reaction flask was allowed to cool to 80° C., and then poured into a jar. The total amount of distillate collected under vacuum was 828.0 grams. The weight of residual materials in the reaction flask (hereinafter the "imidazoline product") was 2625.8 grams.

The imidazoline product was subjected to hydrolysis according to the following procedure. Into each of two 100 mL glass jars were put 50 grams of the imidazoline product obtained from the reaction described in the preceding paragraph. Water was added to both jars, the first jar, 2.70 grams, the second jar, 3.10 grams. In both jars the water was mixed into the imidazoline product using a JIFFY® mixer and the jars (capped) were then placed in a 95° C. oven for 24 hours. JIFFY is a registered trademark.

The hydrolysis products were then recovered and subjected to analyses. Ubbelohde kinematic viscosities at 40° C. were measured to give 23681 and 22879 mm$^2$/sec for the products from the first and the second jars respectively. Carbon-13 nuclear magnetic resonance (C-13 NMR) analyses revealed that the product from the first jar contained 10% imidazoline end groups and 90% amide end groups with 9% of the amide end groups being tertiary amide. Product from the second jar showed, by C-13 NMR, 4% imidazoline end groups and 96% amide end groups with 6% of the amide end groups being tertiary amide.

EXAMPLE 2

Example 1 was repeated in a 500 ml flask at 1/15 the scale of Example 1. A similar imidazoline product was obtained.

C-13 NMR analysis of this imidazoline product indicated that about 85% of the end groups were imidazoline end groups, the remaining 15% being amide end groups, amino groups and hydroxyl groups.

EXAMPLE 3

The imidazoline product from EXAMPLE 1 was subjected to hydrolysis according to the following procedure. Into each of two one-liter glass jars were put 700 grams of the imidazoline product and 37.8 grams of water. In both jars the water was mixed into the imidazoline product using a JIFFY mixer and the jars were capped and then placed in a 95° C. oven for 24 hours. The hydrolysis products were then recovered and subjected to analyses. Ubbelohde kinematic viscosities at 40° C. were measured to give 21516 and 21811 mm$^2$/sec for the products from the first and the second jars respectively.

EXAMPLE 4

The products from both jars of EXAMPLE 3 were mixed with EPON Resin 828 at various weight ratios using a JIFFY mixer in different flasks. The mixtures were rapidly degassed under vacuum in a flask in a 100° C. oil bath. The degassed mixtures were poured into molds consisting of two metal plates separated by a polytetrafluoroethylene spacer 1/8" (3.2 mm) in diameter. The materials were allowed to cure overnight (about 16 hours) at room temperature (about 25° C.) and then were post-cured at 100° C. for two hours. The cured castings were removed from the molds and test samples were cut from the castings. The testing results of various casting samples are tabulated in TABLE A.

TABLE A

| Example | 6 | 7 | 8 | 9 | 10 | 11 |
|---|---|---|---|---|---|---|
| Curing Agent, grams per 100 grams of EPON Resin 828 | 110 | 140 | 175 | 210 | 250 | 280 |
| Tear resistance, kN/m ASTM D-624, crosshead speed 59.8 cm/min | 111 ± 18 | 146 ± 6 | 143 ± 7 | 52 ± 2 | 16 ± 1 | 7 ± 2 |
| R.T. dry tensile (ASTM D-638, crosshead speed 0.508 cm/min) | | | | | | |
| Strength, MPa | 10 ± 4 | 20 ± 3 | 31 ± 3 | 8.5 ± 2.0 | 0.51 ± 0.13 | 0.011 ± 0.005 |
| Modulus, MPa | 289 ± 115 | 1070 ± 238 | 257 ± 81 | 2.0 ± 0.2 | 0.46 ± 0.06 | 0.21 ± 0.10 |
| Elongation % | 20 ± 3 | 82 ± 37 | 212 ± 14 | 316 ± 23 | 483 ± 34 | 363 ± 155 |

EXAMPLE 5

Comparative curing experiments similar to Example 4 were carried out for EPON Resin 828 with a commercially available dimer acid derived diamine curing agent, Witco Humko KEMAMINE® DP-3695. KEMAMINE is a registered trademark of Witco Chemical Company. The testing results are shown in TABLE B.

TABLE B

| Example | 12 | 13 | 14 |
|---|---|---|---|
| Witco Humko Kemamine DP-3695, grams per 100 grams of EPON ® Resin 828 | 88 | 121 | 154 |
| Tg, Rheometrics, ° C. | | | |
| tan δ peak | 48 | 28 | 15 |
| glassy "knee" | 35 | 16 | −1 |
| rubbery "heel" | 52 | 34 | 25 |

TABLE B-continued

| Example | 12 | 13 | 14 |
|---|---|---|---|
| Tear resistance, KN/m (ASTM D-624, crosshead speed 50.8 cm/min) | 62 ± 4 | 54 ± 3 | 11 ± 1 |
| R.T. dry tensile (ASTM D-638, crosshead speed 0.508 cm/min) | | | |
| Strength, MPa | 20 ± 1 | 9.3 ± 0.4 | 2.2 ± 0.4 |
| Modulus, MPa | 791 ± 11 | 5.4 ± 0.3 | 1.1 ± 0.1 |
| Elongation, % | 12 ± 3 | 132 ± 1 | 190 ± 13 |

From the testing results disclosed in TABLES A and B, systems based on EPON Resin 828 cured with the invention HEED-dimer acid condensate polyamide (obtained after hydrolysis in EXAMPLE 3) are much better than similar systems obtained from using a commercially available dimer diamine, KEMAMINE DP-4695, (EXAMPLE 5) in terms of combinations of elongation to break with tensile strength, tensile modulus and tear resistance.

Figure 2:
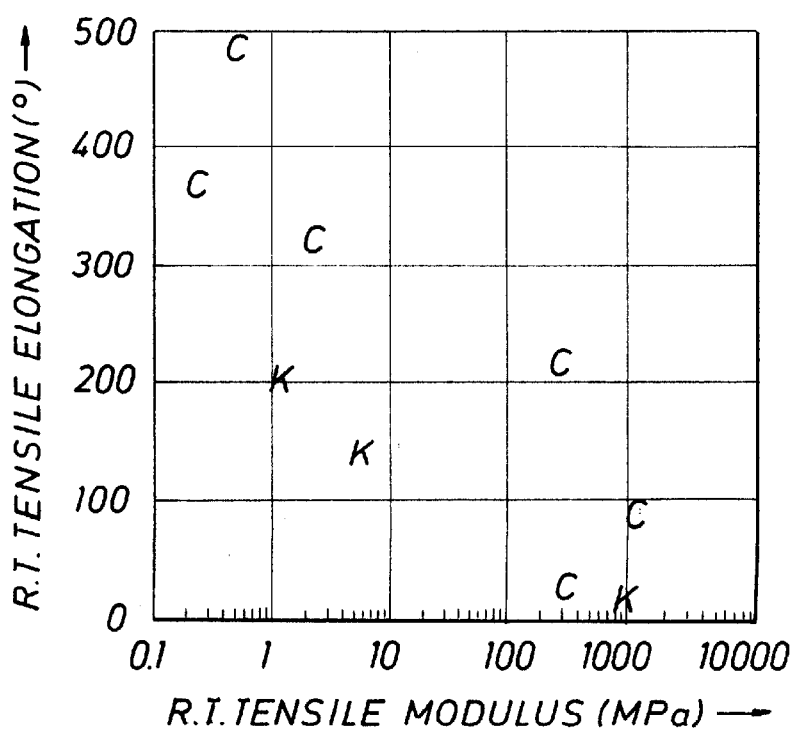
FIG. 2 shows R.T. tensile elongation as a function of R.T. tensile modulus for systems C (with curing agent of this invention) and K (Witco Humko KEMAMINE® DP-3695) respectively.
Figure 3:
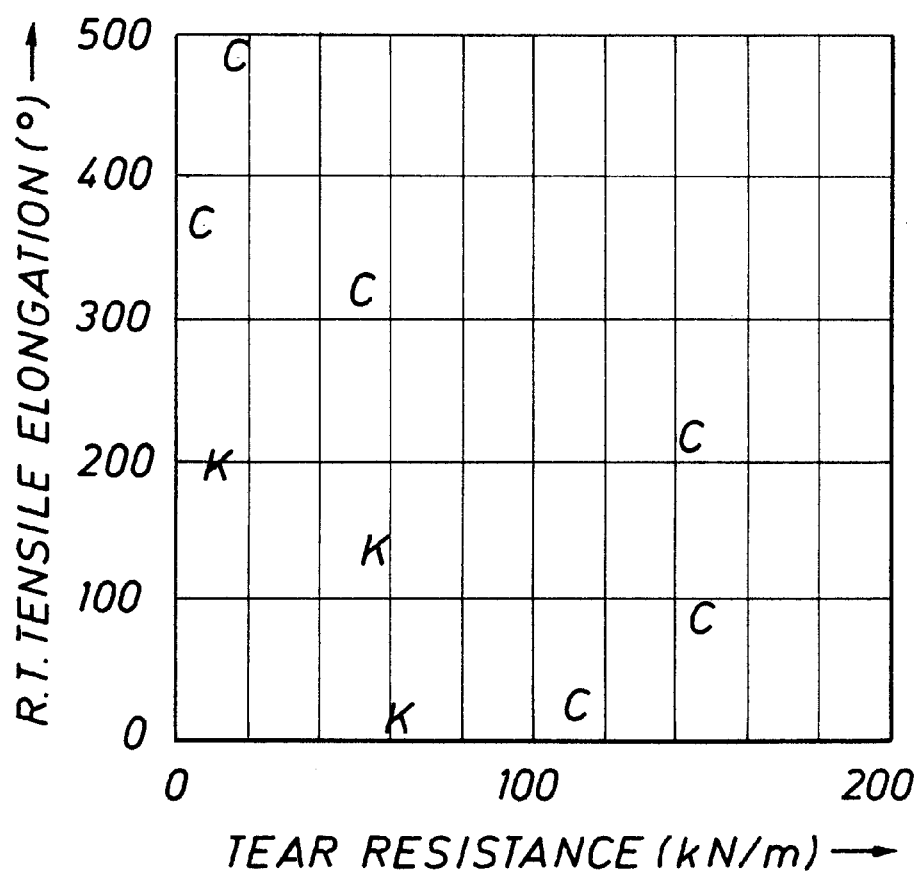
FIG. 3 shows R.T. tensile elongation as a function of tear resistance for systems C (with curing agent of this invention) and K (Witco Humko KEMAMINE® DP-3695) respectively.

The data from TABLES A and B are also presented in FIGS. 1, 2 and 3. The data obtained by using this invention are represented with symbol "C" and the data from using KEMAMINE DP4695 are represented with symbol "K." Over a range of curing agent/resin ratios, the liquid amine-terminated polyamide prepared in EXAMPLE 1 gave better performance than that obtained in EXAMPLE 5 with the commercially available dimer diamine KEMAMINE DP-4695.

From the foregoing description, one skilled in the art can appreciate the advantages and other essential characteristics of this invention. A further understanding of the nature and advantage of this invention herein may be realized by reference to the remaining portions of the specification and the appended claims. Also it is to be understood that the examples described herein are to be taken as preferred examples of the same and for illustration purposes only. Various changes or modifications may be made without departing from the spirit or scope of the invention, which is defined by the following claims.

What is claimed:

1. A curable epoxy composition comprising:
    an epoxy resin having at least 1.5 epoxy groups per molecule; and
    a liquid amine-terminated polyamide,
wherein the liquid amine-terminated polyamide is prepared by reacting
    (a) carboxylic acids selected from the group consisting of $C_{18}$–$C_{60}$ dicarboxylic acids, $C_{18}$–$C_{60}$ dicarboxylic acid derivatives and mixtures thereof, wherein said carboxylic acids optionally contain di- or polycarboxylic acids or acid derivatives having from 4 to 20 carbon atoms in an amount ranging from 0–10% based on all carboxylic acids; and
    (b) at least one amine having a formula:

$R^1$—NH—$R^2$—NH—$R^3$, wherein $R^1$ having a total number of carbon atoms from 0 to about 20, is selected from the group consisting of H, alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl;
    $R^3$ having a total number of carbon atoms from 1 to about 20, is selected from the group consisting of alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl; and
    $R^2$ is $(CR^4R^5)_n$, wherein n is from 2 to about 20, $R^4$ is independently selected for each $(CR^4R^5)$ from the group consisting of H, alkyl, aryl, hydroxyl, alkoxy, alkylthio, dialkylamino and cyano; and $R^5$ is independently selected for each $(CR^4R^5)$ from the group consisting of H, alkyl and aryl.

2. The composition of claim 1, wherein the mole ratio of the epoxy resin to the liquid amine-terminated polyamide is from about 3:1 to about 1:3.

3. The composition of claim 1, wherein the dicarboxylic acid derivatives are selected from dicarboxylic anhydride, dicarboxylic halide, dicarboxylic acid monoester, dicarboxylic acid diester, and mixtures thereof.

4. The composition of claim 1, wherein said composition further comprises water, wherein the polyamide is mixed with water to provide an emulsion when preparing the composition.

5. The composition of claim 1, wherein $R^2$ is selected from the group consisting of $(CH_2)_2$, $(CH_2)_3$, $(CH_2)_4$ and mixtures thereof.

6. The composition of claim 1, wherein the amine is selected from the group consisting of N-methylethylenediamine, N-ethylethylenediamine, N-benzylethylenediamine, N, N'-dimethylethylenediamine, N, N'-diethylethylenediamine, N-(2-hydroxyethyl) ethylenediamine (HEED), N-(2-cyanoethyl) ethylenediamine, N-(2-methoxyethyl)ethylenediamine, N-cyclohexyl-1,3-propanediamine, 2-hydroxy-N-methyl-1,3-propanediamine, N-methyl-1,6-hexanediamine and mixtures thereof.

7. The composition of claim 1, wherein the amine and the carboxyl compound are used in a ratio of moles of amine molecule to equivalents of carboxyl group of greater than about 0.9 to 1.

8. The composition of claim 1, wherein the liquid amine-terminated polyamide has a number average amine hydrogen functionality, N—H, in the range of from about 1.7 to about 4.0.

9. The curable epoxy composition of claim 1, wherein said composition is cured under conditions effective to produce an article, a membrane, a secondary containment membrane, a film or a cured coating on a surface of a substrate.

10. A curable epoxy composition comprising:
    an epoxy resin having at least 1.5 epoxy groups per molecule; and
    a liquid amine-terminated polyamide having a number average amine hydrogen functionality, N—H, in the range of from about 1.7 to about 4.0,
wherein the composition is characterized by a mole ratio of the epoxy resin to the liquid amine-terminated polyamide from about 3:1 to about 1:3, and the liquid amine-terminated polyamide is prepared by reacting
    (a) a carboxyl compound selected from the group consisting of $C_{18}$–$C_{60}$ dicarboxylic acids, $C_{18}$–$C_{60}$ dicarboxylic acid halides, $C_{18}$–$C_{60}$ dicarboxylic acid esters and mixtures thereof; and
    (b) at least one amine selected from the group consisting of N-methylethylenediamine, N-ethylethylenediamine, N-benzylethylenediamine, N,N'-dimethylethylenediamine, N,N'-diethylethylenediamine, N-(2-hydroxyethyl)

ethylenediamine, N-(2-cyanoethyl)ethylenediamine, N-(2-methoxyethyl)ethylenediamine, N-cyclohexyl-1,3-propanediamine, 2-hydroxy-N-methyl-1,3-propanediamine and N-methyl-1,6-hexanediamine, wherein the amine and the carboxyl compound are used in a ratio of moles of amine molecule to equivalents of carboxyl group of greater than about 0.9 to 1.

11. The curable epoxy composition of claim 10, wherein said composition is cured under conditions effective to produce an article, a membrane, a secondary containment membrane, a film or a cured coating on a surface of a substrate.

12. A method for preparing a curable epoxy composition, the method comprising forming a mixture comprising an epoxy resin having at least 1.5 epoxy groups per molecule and a liquid amine-terminated polyamide, wherein the liquid amine-terminated polyamide is prepared by reacting (a) carboxylic acids selected from the group consisting of $C_{18}$–$C_{60}$ dicarboxylic acids, $C_{18}$–$C_{60}$ dicarboxylic acid derivatives and mixtures thereof, wherein said carboxylic acids optionally contain di- or polycarboxylic acids or acid derivatives having from 4 to 20 carbon atoms in an amount ranging from 0–10% based on all carboxylic acids; and (b) at least one amine having a formula:

$$R^1\text{—NH—}R^2\text{—NH—}R^3,$$

wherein $R^1$ having a total number of carbon atoms from 0 to about 20, is selected from the group consisting of H, alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl;

$R^3$ having a total number of carbon atoms from 1 to about 20, is selected from the group consisting of alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl; and $R^2$ is $(CR^4R^5)_n$, wherein n is from 2 to about 20, $R^4$ is independently selected for each $(CR^4R^5)$ from the group consisting of H, alkyl, aryl, hydroxyl, alkoxy, alkylthio, dialkylamino and cyano; and $R^5$ is independently selected for each $(CR^4R^5)$ from the group consisting of H, alkyl and aryl.

13. A curable epoxy composition comprising:

an epoxy resin having at least 1.5 epoxy groups per molecule; and an amine-terminated polyamide, wherein the amine-terminated polyamide is prepared by reacting (a) carboxylic acids selected from the group consisting of $C_{30}$–$C_{40}$ dicarboxylic acids, $C_{30}$–$C_{40}$ dicarboxylic acid derivatives and mixtures thereof, wherein said carboxylic acids optionally contain di- or polycarboxylic acids or acid derivatives having from 4 to 20 carbon atoms in an amount ranging from 0–10% based on all carboxylic acids; and (b) at least one amine having a formula:

$$R^1\text{—NH—}R^2\text{—NH—}R^3,$$

wherein $R^1$ having a total number of carbon atoms from 0 to about 20, is selected from the group consisting of H, alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl;

$R^3$ having a total number of carbon atoms from 1 to about 20, is selected from the group consisting of alkyl, cycloalkyl, arylalkyl, hydroxyalkyl, alkoxyalkyl, cyanoalkyl, alkylthioalkyl, dialkylaminoalkyl, aryl, alkylaryl, cyanoaryl, alkoxyaryl, alkylthioaryl, and dialkylaminoaryl; and $R^1$ is $(CR^4R^5)_n$, wherein n is from 2 to about 20, $R^4$ is independently selected for each $(CR^4R^5)$ from the group consisting of H, alkyl, aryl, hydroxyl, alkoxy, alkylthio, dialkylamino and cyano; and $R^5$ is independently selected for each $(CR^4R^5)$ from the group consisting of H, alkyl and aryl.

14. The composition of claim 1, wherein the carboxylic acids are selected from the group consisting of $C_{30}$–$C_{40}$ dicarboxylic acids, $C_{30}$–$C_{40}$ dicarboxylic acid derivatives and mixtures thereof.

15. The curable epoxy composition of claim 10, wherein the carboxylic acids are selected from the group consisting of $C_{30}$–$C_{40}$ dicarboxylic acids, $C_{30}$–$C_{40}$ dicarboxylic acid halides, $C_{30}$–$C_{40}$ dicarboxylic acid esters and mixtures thereof.

16. The method of claim 12, wherein the carboxylic acids are selected from the group consisting of $C_{30}$–$C_{40}$ dicarboxylic acids, $C_{30}$–$C_{40}$ dicarboxylic acid derivatives and mixtures thereof.

* * * * *